Aug. 25, 1959 G. DESTRIAU 2,901,651
ELECTROLUMINESCENT CELL
Filed June 21, 1955 2 Sheets-Sheet 1
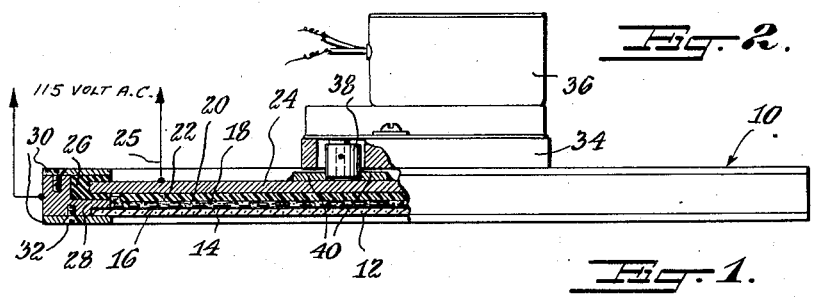
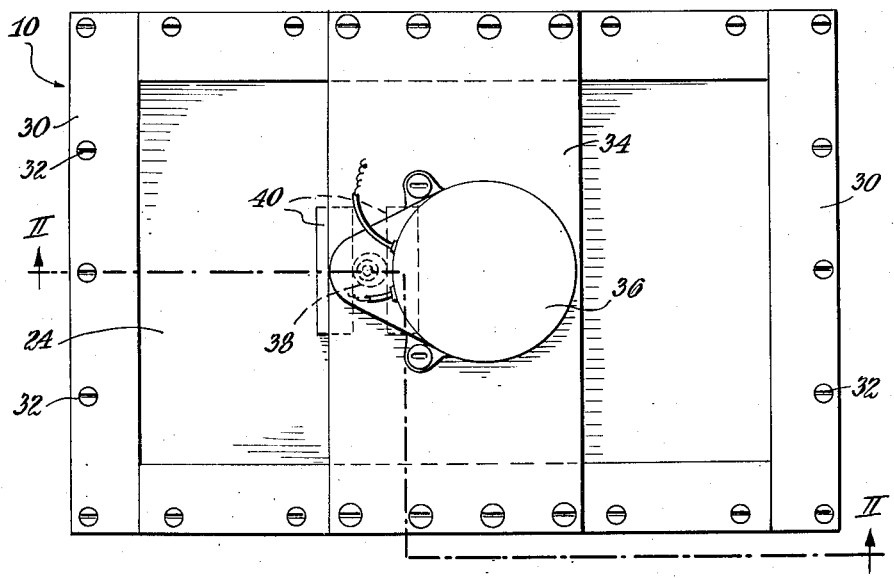
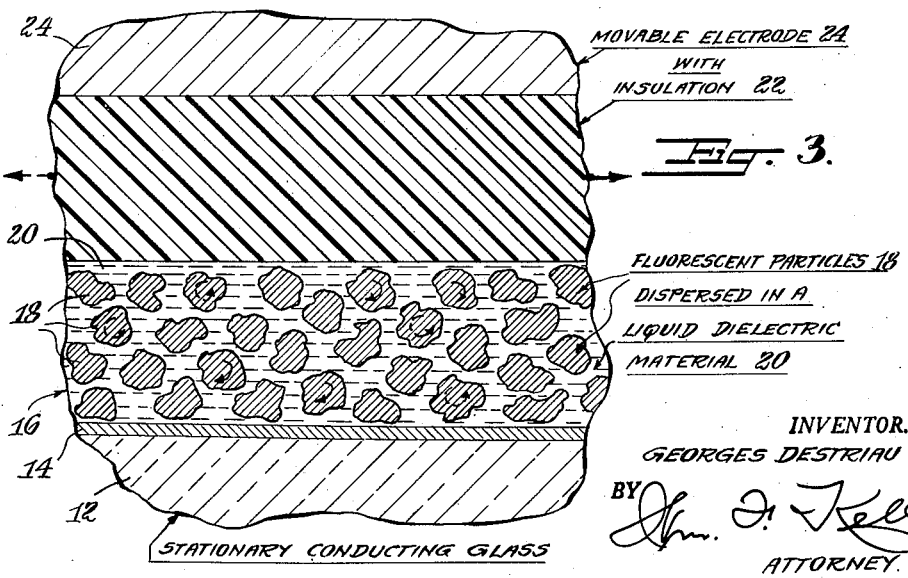
INVENTOR.
GEORGES DESTRIAU Aug. 25, 1959  G. DESTRIAU  2,901,651
ELECTROLUMINESCENT CELL
Filed June 21, 1955  2 Sheets-Sheet 2

INVENTOR.
GEORGES DESTRIAU.
BY
ATTORNEY.

United States Patent Office

2,901,651
Patented Aug. 25, 1959

2,901,651

ELECTROLUMINESCENT CELL

Georges Destriau, Cauderan, France, assignor to Westinghouse Electric Corporation, East Pittsburgh, Pa., a corporation of Pennsylvania Application June 21, 1955, Serial No. 517,001

4 Claims. (Cl. 313—108)

This invention relates to electroluminescent cells and, more particularly, to an improved cell construction and method of operation whereby the light output is increased.

The process of electroluminescence consists of the emission of light from a phosphor when it is subjected to an electric field; in other words, the phosphor may be termed field-responsive. If one is to consider a field-responsive phosphor particle embedded in an insulator, such as an oil or a plastic material, an alternating field is necessary in order to generate sustained light output; if a constant field is applied, polarization develops in the material and only a single flash of light is obtained when the field is applied and another flash when the field is removed.

The usual electroluminescent cell type of construction is disclosed in London, Edinburg and Dublin Philosophical Magazine, series 7; volume 38; No. 285, pages 700–737, October 1947, article by G. Destriau. This and other publications resulted in stimulating much research and development on the phenomenon of electroluminescence, but the commerical application of electroluminescent cells has been severely limited by their lack of brightness.

It is the general object of this invention to provide an electroluminescent cell construction which operates with increased brightness.

It is a further object of this invention to provide a method for operating an electroluminescent cell which will provide increased cell brightness.

The aforesaid objects of this invention, and other objects which will become apparent as the description proceeds, are achieved by providing an electroluminescent cell construction and method for operation of this cell wherein the field-responsive phosphor particles are rotatable about their axes with respect to the electrodes and thus with respect to the alternating field to increase the cell brightness.

For a better understanding of the invention reference should be had to the accompanying drawings wherein:

Fig. 1 is a plan view of an electroluminescent cell constructed in accordance with the general teachings of this invention;

Fig. 2 is a side elevation, partly in section, taken on the lines II—II of Fig. 1;

Fig. 3 is a fragmentary enlargement of the cross-section shown in Fig. 2, illustrating details of the cell construction and of the cell operation;

Figure 5:
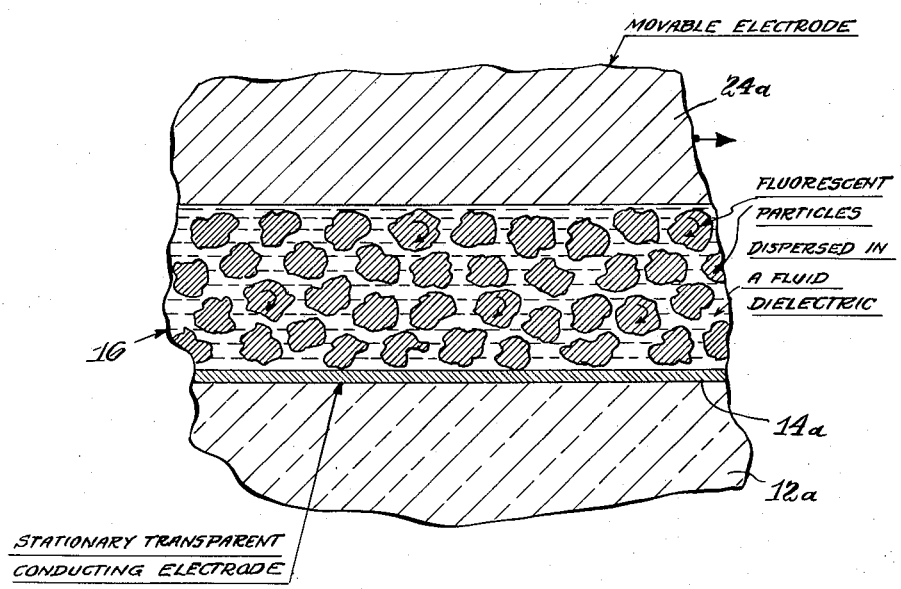
Fig. 5 is a fragmentary enlargement of the alternative embodiment of Fig. 4.

With specific reference to the form of the invention illustrated in Figs. 1, 2 and 3, the numeral 10 indicates generally an electroluminescent cell comprising a light-transmitting backing plate 12 such as glass, for example, having coated thereover a thin, transparent conducting layer 14 such as tin oxide, for example. Over the thin conducting layer 14 is placed a layer 16 of field-responsive phosphor particles 18 embedded in a light-transmitting liquid dielectric material 20 such as castor oil, for example. Over the phosphor-dielectric layer 16 may be placed a thin sheet of insulating material 22 such as mica, for example, in order to prevent cell breakdown under the stress of very high fields. A second electrode 24, which may be of metal such as copper, for example, is placed over the insulating layer 22. The two electrodes are adapted to be connected to a source of 115 v., 60 cycle A.C. potential by leads 25.

The second electrode 24 is adapted to be laterally moved with respect to the first electrode 14 and in order to achieve such movement the edges of the second electrode are embedded in a flexible sealing material 26 such as rubber, for example. Such a sealing method allows relative movement between the two electrodes and yet prevents any loss of fluid dielectric from the cell. Correct spacing between the cell electrodes is achieved by means of a metallic spacer 28 which serves to both space the electrodes 14 and 24 and act as a retaining means for the rubber gasket 26. The spacing and retaining piece 28 may be readily assembled and disassembled to facilitate cell fabrication, assembly being accomplished by retaining plates 30 and screws 32 which serve to hold the electrodes rigidly with respect to one another.

The cell frame which is formed by the retaining plates 30 has attached to two opposite sides thereof a motor bed 34 to which a motor 36 is attached. The motor actuates an eccentric 38 which cooperates with two embossments 40 which are attached to the metal electrode 24. Thus when the motor actuates the eccentric, the electrode 24 which is free to float in a lateral direction with respect to the electrode 14, is moved back and forth with an oscillatory motion.

In Fig. 3 is illustrated an enlarged cross-sectional view showing the operation of the cell. When the eccentric moves the floating electrode 24 and mica insulator 22 to the right, as shown in Fig. 3, the liquid dielectric 20 which is in contact therewith will be pulled along and this will cause the phosphor particles 18 to rotate about their axes. When the eccentric 38 reaches the end of its throw and reverses direction the phosphor particles 18 will be rotated in the opposite direction, as shown in dotted lines in Fig. 3.

As a specific example, the thin conducting layer which is coated over the light-transmitting electrode 14 may be applied as described in Patent No. 2,522,531 to Mochel. The field-responsive phosphor particles 18 may consist of zinc oxide activated by $10^{-2}$ to $10^{-5}$ parts by weight of copper, for example, and the liquid light-transmitting dielectric material may be any insulating oil such as castor oil, lubricating oil, banana oil, etc. The aforementioned activator concentration is not intended as limiting. It should be noted that the drawings are not to scale and are only illustrative of the general construction, but the thickness of the phosphor-dielectric may be 0.1 mm., for example, and the mica insulator may also have a thickness of 0.1 mm., for example. These dimensions are only given by way of example and are not intended to be limiting. There may also be three parts by weight of dielectric material per one part by weight of phosphor material, for example. If desired, the mica insulating layer 20 may be dispensed with, as in the embodiment of Fig. 5. While zinc oxide, copper activated phosphor is shown and is preferred, any type phosphor particles may be utilized which are characterized by being field-responsive when stationary in an alternating field and which will display an enhanced light output when the particles are rotated about their axes in an alternating field. In preparing a zinc-oxide phosphor, as given in the foregoing example, finely divided zinc oxide and sufficient copper carbonate to supply $10^{-3}$ parts by weight of copper, for example, in the final phosphor may be fired at 700° C. for one-half hour in a hydrogen atmosphere.

Utilizing the foregoing construction and applying an electric field of 115 volts-60 cycles across the electrodes 14 and 24, a light output of 25 arbitrary units has been observed, with no movement of the electrodes with respect to one another. After actuating the electrode 24 with respect to the electrode 14 at a maximum rate of 1 cm. per second, an increase in light output of fourfold has been achieved, that is, a light output of 100 arbitrary units has been observed. No explanation of this increase in light is offered at this time, but it is definitely not that type of luminescence which is known as triboluminesence (luminesence due to friction) since when the electrodes are moved with respect to one another without the applied field, no light is emitted. It should also be noted that it has previously been disclosed in "Comptes Rendus," volume 223, page 894 (1946), article by G. Destriau and J. Mattler that if a phosphor particle is rotated in a static or constant field, a sustained light emission is obtainable. The phenomenon herein described is quite different from that where a static or constant field is utilized, since in the latter phenomenon the emitted light is attributed to a depolarization of the phosphor particles. In addition, all normally electroluminescent phosphors are sensitive to this phenomenon described in "Comptes Rendus." The instant phenomenon, in contrast, is displayed only by a limited number of phosphors.

Figure 4:
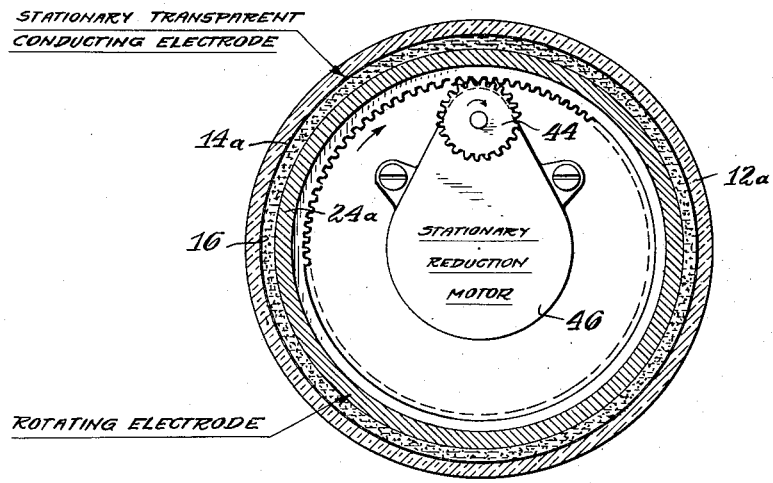
Fig. 4 is a cross-sectional view, shown partly in section, illustrating an alternative embodiment of the cell of this invention.

In Figs. 4 and 5 are illustrated an alternative embodiment of the invention wherein the electrodes 14a and 24a are formed as two concentric cylinders having the phosphor and dielectric layer 16 included therebetween. The ends of the tubular electrode-backing plate and electrodes 14a and 24a may be sealed in rubber gaskets to prevent egress of the dielectric fluid. As illustrated in Fig. 4, the inner electrode 24a, which may be fabricated as in the preferred embodiment, has gears cut in the inner face thereof which cooperate with a driving gear 44. The driving gear is attached to a stationary reduction motor 46 which rotates the inner electrode 24a with respect to the outer electrode 14a. In the preferred embodiments of Figs. 1, 2 and 3, an oscillatory motion was used to rotate the phosphor particles. In the embodiment of Fig. 4, a continuous unidirectional motion of one electrode with respect to the other may be utilized although, if desired, an oscillatory motion may also be utilized in this alternative embodiment. In the embodiment as illustrated in Figs. 4 and 5, no separate layer of insulating material, such as mica, has been utilized although such a layer could be incorporated, if desired. The electrode materials, spacing, phosphor material, etc. may be as given in the preferred embodiment.

Figure 6:
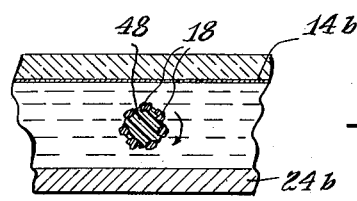
Fig. 6 is a fragmentary sectional enlargement illustrating a further alternative embodiment of this invention.

In Fig. 6 is illustrated a fragmentary enlargement of a still further alternative embodiment wherein the electrodes 24b and 14b are maintained stationary and the phosphor particles are rotated about their axes between these two stationary electrodes. To accomplish this, the phosphor particles 18 may be imbedded on the surface of a non-conducting rod 48 which rod may be fabricated of a plastic material such as polytetrafluoroethylene, for example. The rod is sealed through the periphery of the cell, which may be generally fabricated as illustrated in Fig. 1, and may be rotated either in a unidirectional manner or in an oscillatory fashion either by hand or by a driving motor. This will rotate phosphor particles about their axes within the alternating electric field. The rod may have a diameter of 0.1 mm., for example, and the electrode spacing may be 0.3 mm., for example.

The embodiment of Fig. 6 may be fabricated of materials as given for the preferred embodiments of Figs. 1, 2 and 3. The speed of rotation for the embodiment of Figs. 4 and 5 may be one centimeter per second, although there is nothing critical about the speed of rotation. The rod 48 in which the phosphor particles are embedded, as illustrated in Fig. 6, may be rotated at about six revolutions per second, for example, although there is nothing critical about this speed of rotation.

It will be recognized that the objects of the invention have been achieved by providing an electro-luminescent cell construction and method of operation wherein the light output is enhanced.

While in accordance with the Patent Statutes one best known embodiment of the invention has been illustrated and described in detail, it is to be particularly understood that the invention is not limited thereto or thereby.

I claim:

1. An electroluminescent cell comprising two parallel electrodes, at least one of which is light-transmitting, electroluminescent phosphor particles and liquid light-transmitting dielectric material contained between said electrodes, said phosphor particles exhibiting light emission when stationary in an alternating field and exhibiting enhanced light emission when rotated about their axes in an alternating field, said electrodes adapted to have applied thereto an alternating potential, said phosphor particles adapted to be rotated about their axes with respect to said electrodes, and means for effecting an axial rotation of said phosphor particles with respect to said electrodes.

2. An electroluminescent cell comprising two parallel electrodes, at least one of which is light-transmitting, electroluminescent zinc-oxide, copper activated phosphor particles and liquid light-transmitting dielectric material contained between said electrodes, said electrodes adapted to have applied thereto an alternating potential, said phosphor particles adapted to be rotated about their axes with respect to said electrodes, and means for effecting an axial rotation of said phosphor particles with respect to said electrodes.

3. An electroluminescent cell comprising two parallel electrodes, at least one of which is light-transmitting, electroluminescent phosphor particles and liquid light-transmitting dielectric material contained between said electrodes, said phosphor particles exhibiting light emission when stationary in an alternating field and exhibiting enhanced light emission when rotated about their axes in an alternating field, said electrodes adapted to have applied thereto an alternating potential, and one of said electrodes adapted to be moveable with respect to the other electrode.

4. An electroluminescent cell comprising two parallel electrodes, at least one of which is light transmitting, liquid light-transmitting dielectric material and electroluminescent phosphor particles consisting of zinc oxide activated by from $10^{-2}$ to $10^{-5}$ parts by weight of copper contained between said electrodes, said phosphor particles exhibiting light emission when stationary in an alternating electric field and exhibiting enhanced light emission when rotated about their axes in an alternating electric field, said electrodes adapted to have applied thereto an alternating potential, said phosphor particles adapted to be rotated about their axes with respect to said electrodes, and means for effecting an axial rotation of said phosphor particles with respect to said electrodes.

References Cited in the file of this patent

Destriau: New Phenomenon of Electrophotoluminescence, Philosophical Mag., October 1947, vol. 38, pages 700–702, 711–713, 723.